(12) United States Patent
Sebright et al.

(10) Patent No.: US 6,561,361 B2
(45) Date of Patent: May 13, 2003

(54) BELT FILTER PRESS WITH IMPROVED WEDGE SECTION

(75) Inventors: Brent H. Sebright, Hopkins, MI (US); Stuart Sebright, Allegan, MI (US); Joseph W. Dendel, Allegan, MI (US); Benjamin W. Dietz, Allegan, MI (US)

(73) Assignee: Sebright Products, Inc., Hopkins, MI (US)

( * ) Notice: Subject to any disclaimer, the term of this patent is extended or adjusted under 35 U.S.C. 154(b) by 0 days.

(21) Appl. No.: 09/683,758

(22) Filed: Feb. 11, 2002

(65) Prior Publication Data

US 2002/0162788 A1 Nov. 7, 2002

Related U.S. Application Data

(60) Provisional application No. 60/287,895, filed on May 1, 2001.

(51) Int. Cl.[7] ...................... B01D 33/04; B01D 33/052; B01D 33/048; B01D 33/056; B30B 9/24
(52) U.S. Cl. .................. 210/400; 210/401; 100/118
(58) Field of Search .................. 210/783, 400, 210/401; 700/118

(56) References Cited

U.S. PATENT DOCUMENTS

| | | | |
|---|---|---|---|
| 4,544,447 A | | 10/1985 | Pinter et al. |
| 4,604,195 A | | 8/1986 | Lintunen |
| 4,879,034 A | * | 11/1989 | Bastgen |
| 4,885,088 A | | 12/1989 | Sbaschnigg |
| 5,310,383 A | * | 5/1994 | Lisi |
| 5,456,832 A | | 10/1995 | Louden et al. |
| 5,543,044 A | | 8/1996 | Louden et al. |
| 5,656,165 A | * | 8/1997 | Yamamoto et al. |
| 6,248,245 B1 | * | 6/2001 | Thompson |

FOREIGN PATENT DOCUMENTS

GB          2051598     *  1/1981

\* cited by examiner

*Primary Examiner*—Thomas M. Lithgow

(57) ABSTRACT

A belt filter press for deliquifying a material comprises two endless filter belts disposed adjacent each other so that a portion of the belts travel together and converge towards one another in a curved wedge section through which a material is progressively compressed, wherein the concavity of the wedge section is oriented toward gravity.

11 Claims, 2 Drawing Sheets

BELT FILTER PRESS WITH IMPROVED WEDGE SECTION

CROSS REFERENCE TO RELATED APPLICATIONS

This application claims the benefit of U.S. Provisional Application No. 60/287,895, filed May 1, 2001.

BACKGROUND OF INVENTION

1. Field of the Invention

This invention relates to belt filter presses for removing liquid from a mixture of liquid and solid material. In one aspect, the invention relates to an improved wedge section for a belt filter press.

2. Description of the Related Art

Belt filter presses are utilized to remove liquid from a mixture of liquid and solid material, leaving a relatively dry, solid "cake" for disposal or further processing. The belt filter press comprises a frame and an assembly of rollers that support and drive an upper continuous belt and a lower continuous belt that are in operable communication with each other. The belts are permeable to allow the extrusion of the liquid therethrough. The mixture is first placed on the lower belt, then "sandwiched" between the upper and lower belts. The belts and the retained mixture then pass through a wedge section where the mixture is evenly distributed between the belts, and an initial volume of liquid is removed. The belts then pass through a series of progressively smaller diameter rollers where the retained mixture is compressed for further liquid removal. The belts are then separated and the dry "cake" is removed from the belts, generally by a scraping apparatus. The belts then pass through one or more belt washers, after which the process is repeated. The liquid from the extrusion and belt washing processes are collected for disposal.

The wedge section is generally planar, which is suitable for even distribution of the mixture between the belts. However, material passing over a planar wedge section will not be as effectively dewatered as material passing over a curved wedge section. Furthermore, the wedge section typically comprises a flat plate in full contact with the lower belt. Consequently, liquid that is extruded from the mixture must flow laterally to the edges of the belts in order to be removed. The drainage path defined by this lateral movement is appreciably longer than a drainage path perpendicular to the plane of the belts. The longer drainage path impedes the removal of liquid from the mixture.

SUMMARY OF INVENTION

The invention comprises an improved curved wedge section for a belt filter press for removing liquid from a mixture of liquid and solid material. The belt filter press comprises two endless filter belts disposed adjacent each other so that a portion of the belts travel together and converge towards one another in a curved wedge section through which a material is progressively compressed. The concavity of the wedge section is oriented toward gravity. The wedge section comprises a plurality of parallel-spaced belt supports comprising a rigid, polymeric material such as an ultra high molecular weight plastic or Nylotron. The supports are supported on parallel-spaced wedge support plates. The wedge section comprises a planar section that transitions into the curved section.

Belts containing the mixture to be dewatered pass over the curved wedge section prior to entering the roller section of the belt filter press. The curvature of the wedge section enhances the extrusion of water from the mixture prior to the belts entering the roller section.

DETAILED DESCRIPTION

Figure 1:
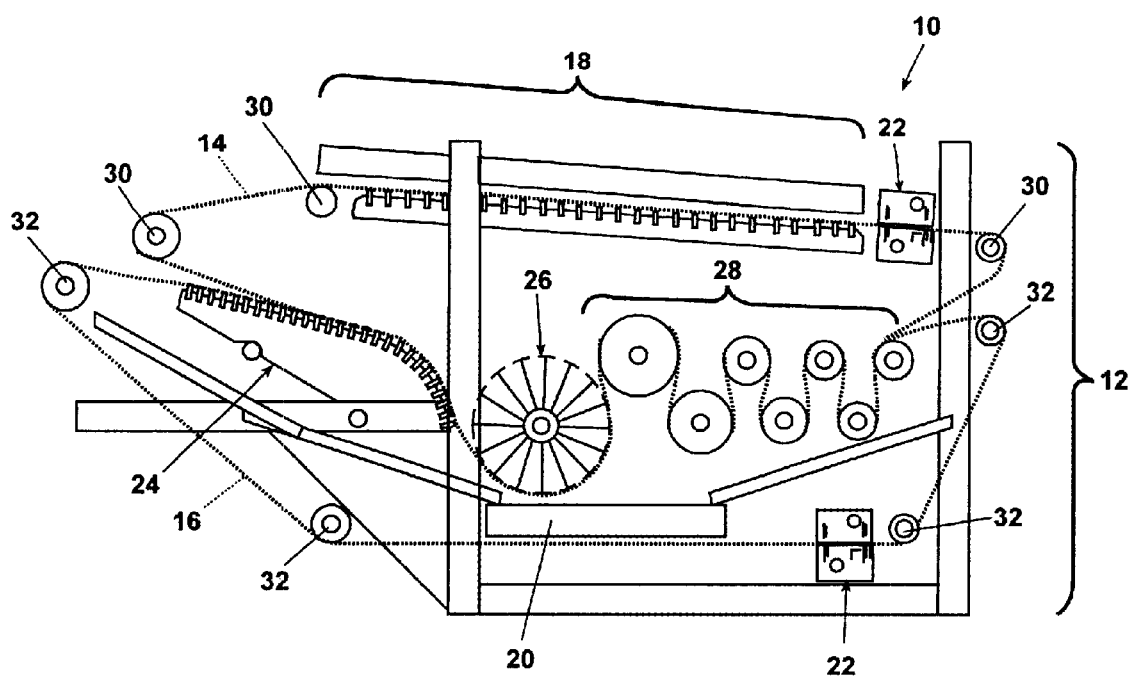
FIG. 1 is a side elevation view of a schematic of a belt filter press illustrating a curved wedge section according to the invention.

Referring now to FIG. 1, a belt filter press 10 according to the invention comprises a frame 12, an upper belt 14, a lower belt 16, a waste placement apparatus 18, liquid catch pans 20, belt washers 22, a wedge section 24, a primary roller 26, secondary rollers 28, upper belt guide rollers 30, and lower belt guide rollers 32. It will be readily understood by one skilled in the art that the belt filter press of FIG. 1 will also comprise suitable belt tensioning devices, belt drives, and controls, which for purposes of this disclosure will not be described herein. As with a conventional belt filter press, the belt filter press 10 of FIG. 1 extrudes liquid from a mixture of solid and liquid material by "sandwiching" the mixture between the two belts 14, 16, passing the belts over the wedge section 24 and around the primary roller 26 and secondary rollers 28, and discharging the dewatered solids upon separation of the belts 14, 16.

Figure 2:
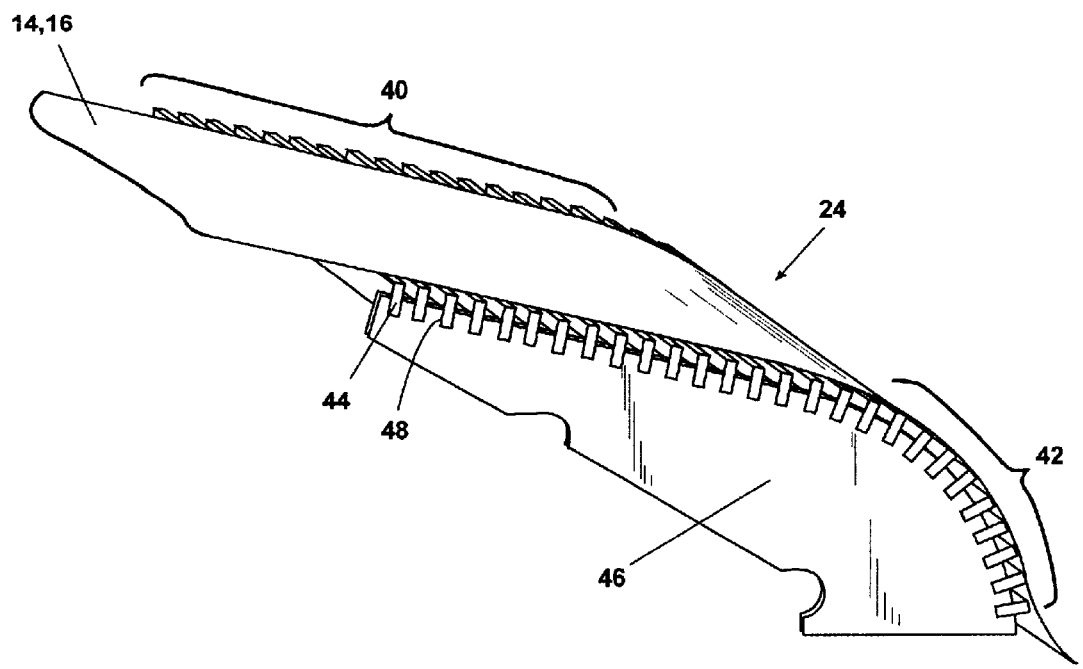
FIG. 2 is a perspective close-up view of the curved wedge section of the belt filter press of FIG. 1.

The wedge section of a conventional belt filter press provides an initial removal of liquid from the mixture through the action of the belts passing over the wedge section. Referring to FIG. 2, the wedge section 24 according to the invention comprises a pair of wedge support plates 46 arranged in opposed parallel alignment and a plurality of spaced belt supports 44 extending between the plates 46. The belt supports 44 comprise elongated, slat-like members of rectangular cross-section somewhat longer than the spacing between the wedge support plates 46. In the preferred embodiment, the belt support 44 is made of a rigid, polymeric material, such as Nylotron or ultra high molecular weight plastic ("UHMW").

Each wedge support plate 46 has an edge defining a straight section 40 transitioning to a curved section 42. Each wedge support plate 46 is provided with a plurality of belt support cutouts 48 to receive the belt supports 44 as hereinafter described. The belt support cutouts 48 extend inwardly from the edge of and perpendicular to the straight section 40 and from the edge of and perpendicular to the tangent of the curved section 42. It will be understood that each wedge support plate 46 is provided with suitable apertures, cutouts, and flanges (not shown) for mounting the wedge support plate 46 to the frame 12. The wedge support plates 46 are mounted to the frame 12 parallel to and spaced from each other so that the belt support cutouts 48 on the opposing wedge support plates 46 are in registry with each other. Each belt support 44 is received into a pair of belt support cutouts 48 so that the belt support 44 extends between opposing wedge support plates 46, preferably with a portion of the belt support lying above the plane of the wedge support plate edge. The belt supports 44 are retained within the belt support cutouts 48 through any suitable means, such as friction, adhesives, or screw-type fasteners. When the belt supports 44 are received in the belt support cutouts 48 and the wedge support plates 46 are mounted to the frame 12, the belt supports 44 define a straight section transitioning to a curved section corresponding to the straight section 40 and the curved section 42 of the wedge support plates 46. Thus, the wedge section 24 has a curved portion as well as a straight portion. In one embodiment, the curved section 42 defines a gradually decreasing radius in the direction of belt movement. In an alternate embodiment, the curved section 42 defines a constant radius.

The belts 14, 16 with enveloped mixture pass over the belt supports 44, proceeding from the straight section 40 through the curved section 42 and thence to the roller section. Each of the belt supports 44 imparts a "kneading" pressure to the belts 14, 16 and the mixture, enhancing the extrusion of liquid from the mixture, which in turn flows downwardly through the gaps between the belt supports 44 to be collected in the liquid catch pans 20 and removed. The improved wedge section 24 provides suitable support for the belts 14, 16 and extrusion of liquid from the mixture, while improving the flow of the liquid from the belts 14, 16. The belts 14, 16 and retained material then pass through the rollers 26, 28 to undergo further liquids removal.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention.

What is claimed is:

1. In a belt filter press for deliquifying a material, of the type comprising two spliced endless filter belts disposed adjacent each other so that a portion of the belts travel together and converge towards one another, the belts moving together over a wedge section, and over which a material between the belts is compressed, the improvement wherein:
   the wedge section comprises wedge support plates spaced from each other and a plurality of parallel-spaced belt supports extending between them.

2. The belt filter press of claim 1, wherein the belt supports are formed of a rigid, polymeric material.

3. The belt filter press of claim 2, wherein the belt supports are formed of an ultra high molecular weight plastic.

4. The belt filter press of claim 2, wherein the belt supports are formed of nylon.

5. The belt filter press of claim 1, wherein a portion of the wedge section comprises a curved section.

6. The belt filter press of claim 1, wherein the wedge section comprises a planar section that transitions into a curved section.

7. In a belt filter press for deliquifying a material, of the type comprising two endless filter belts disposed adjacent each other so that a portion of the belts travel together and converge towards one another, the belts moving together over a wedge section having a curved portion defining a concavity, and over which a material between the belts is compressed, the improvement wherein:
   the wedge section has wedge supports spaced from each other with a plurality of parallel-spaced belt supports extending between them, and wherein the concavity of the wedge section is oriented toward gravity.

8. The belt filter press of claim 7, wherein the belt support are formed of a rigid, polymeric material.

9. The belt filter press of claim 8, wherein the belt supports are formed of an ultra high molecular weight plastic.

10. The belt filter press of claim 8, wherein the belt supports are formed of nylon.

11. The belt filter press of claim 7, wherein the wedge section comprises a planar portion that transitions into the curved portion.

* * * * *

UNITED STATES PATENT AND TRADEMARK OFFICE
CERTIFICATE OF CORRECTION

PATENT NO.   : 6,561,361 B2
DATED        : May 13, 2003
INVENTOR(S)  : Brent H. Sebright et al.

It is certified that error appears in the above-identified patent and that said Letters Patent is hereby corrected as shown below:

<u>Column 4,</u>
Line 24, "the belt support are" should be -- the belt supports are --.

Signed and Sealed this

Nineteenth Day of August, 2003

JAMES E. ROGAN
*Director of the United States Patent and Trademark Office*